United States Patent [19]

Voitsekhovsky et al.

[11] 3,972,514

[45] Aug. 3, 1976

[54] CENTRIFUGE FOR THE REFINING OF NONFERROUS METALS

[76] Inventors: Bogdan Vyacheslavovich Voitsekhovsky, ulitsa Maltseva, kottedzh 2; Anatoly Vladimirovich Dolgov, Morskoi prospekt, 36, kv. 30, both of Novosibirsk, U.S.S.R.

[22] Filed: July 2, 1975

[21] Appl. No.: 592,777

[52] U.S. Cl. ................................ 266/204; 210/376; 233/11; 233/22; 233/27; 266/120
[51] Int. Cl.² .......................................... C22B 9/02
[58] Field of Search .................. 210/371, 376, 407; 233/11, 22, 27; 266/34 R, 37

[56] References Cited
UNITED STATES PATENTS 3,537,695   11/1970   Robinson et al. ................. 266/37

*Primary Examiner*—Gerald A. Dost
*Attorney, Agent, or Firm*—Haseltine, Lake & Waters

[57] ABSTRACT

The centrifuge consists of a hollow housing disposed wherein is a hollow bowl containing a hollow pusher whose side wall is formed by the side wall of the bowl. The hollow pusher is capable of reciprocating inside the bowl, being attached to the piston rod of a hydraulic cylinder.

Provided in the end face of the bowl is a loading port serving to admit metal into the pusher. The side wall of the bowl is provided with ports for discharging the products of refining separately. The housing is fitted with annular partitions and with a contrivance for feeding a coolant to the external surface of the bowl within a solid portion. The side wall of the housing is provided with ports for the discharging of the products of refining.

The centrifuge is adapted for the refining of a metal heated up to around 1000°C. The metal is cooled down during the centrifugation, and the fact enables consequent intensification of the process.

2 Claims, 1 Drawing Figure

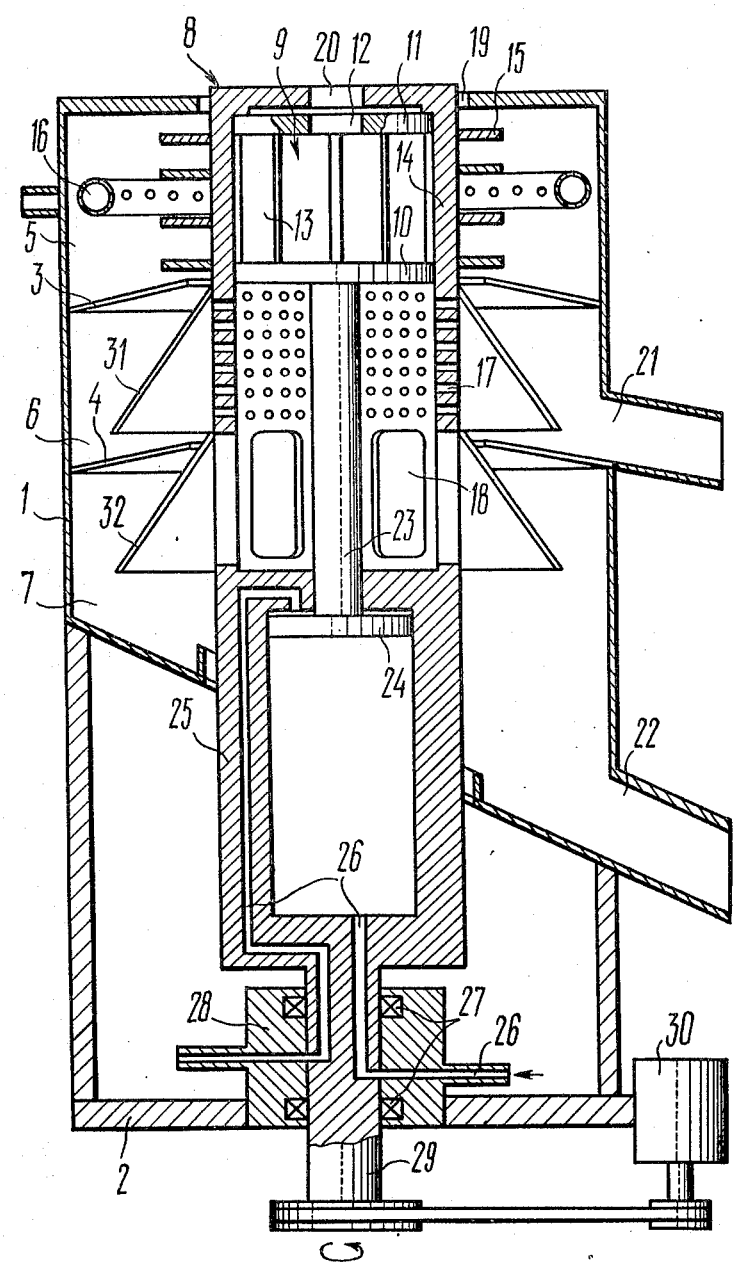

CENTRIFUGE FOR THE REFINING OF NONFERROUS METALS

The present invention relates to centrifuges serving the purpose of separating nonferrous metals, such as, for example, lead, tin or bismuth from impurities which are particles of solid insoluble compounds contained in the melt of the metal to be refined.

Recent years saw more than one apparatus developed for the refining of nonferrous metals which rely for operation on the centrifugal straining of a melt containing impurities in the form of solid particles.

So, by way of illustration, disclosed in the USSR Inventor's Certificate, No. 195,968, is a centrifuge for the straining of liquid metal suspensions, such as molten crude tin. This centrifuge is provided with a hollow cylindrical bowl disposed wherein is a pusher. The pusher is linked up with a motor imparting reciprocating motion thereto and serves the purpose of discharging through a hole in the end face of the bowl the solid particles of impurities separated from the melt. Another function of said hole is to admit the metal to be refined into the top portion of the bowl space. The bowl wall is provided with straining holes passing through which is the metal refined. The centrifuge bowl is disposed in a hollow housing provided with partitions running at right angles to the longitudinal axis of bowl so as to assure the separation of the metal refined from the solid particles of impurities. The metal to be refined is loaded into the top portion of the bowl space above the pusher located below the straining holes in the bowl wall. When the bowl is set spinning, liquid metal passes through the straining holes in the bowl wall and the solid particles settle on the inside of the bowl wall, forming there a porous cake which also filters the metal flowing therethrough.

Yet, to obtain from the known centrifuge a refined metal with the lowermost impurity content, the crude metal should be cooled to the temperature close to its melting point or otherwise complete separation of impurities in the form of solid particles is hardly achievable. For cooling, use is made of additional equipment, i.e., mixers, wherein the metal to be refined is accumulated before being fed into the centrifuge. This is a time-consuming operation, particularly if liquid metal is cooled in big mixers.

Simultaneously with the cooling, big lumps of liquation impurities which do not lend themselves to processing in the centrifuge form on the surface. These lumps need to be remelted in furnaces, inviting an increase in the irrecoverable losses of the metal refined and, consequently, impairing the economy of the process of metal refining.

Also known is a centrifuge for the separation of nonferrous metals from impurities forming solid crystalline compounds in the molten metal. The bowl of said centrifuge is periodically immersed into the melt and the metal refined is separated from the impurities which accumulate inside the bowl. From time to time, the bowl is withdrawn from the melt and given additional speed so as to discharge the cake.

The immersible centrifuge caters for the refining of metal under the conditions of a decrease in the temperature of the melt. Yet, the thermal resistance of the metal the centrifuge bowl is made of is a factor limiting the level of said temperature which is not over 650°C taking into account the properties of the known materials used for the construction of highly-stressed bowls of modern centrifuges employed to cope with the process of metal refining. On the other hand, the metal leaves the furnace at a temperature between 1100°C and 1200°C so that extra facilities intended to accumulate the molten metal and cool it down during a protracted period are indispensable.

Since metallurgy is the mainstay of mechanical engineering and the demand for quality metal used in the fabrication of various machinery is on an upgrade, there is a necessity to provide apparatus adapted for the refining of high-temperature melts.

The main object of the present invention is to provide a centrifuge for the refining of nonferrous metals heated up to a temperature around 1000°C.

Another not less important object of the present invention is to cut the period during which the process of metal refining takes place, this being achieved by a recourse to forced cooling in a centrifuge at a high rate and by combining the liquation, straining and centrifugation into a single process.

A further object of the present invention is to increase the recovery of metal and reduce metal waste.

Said and other objects are attained by providing a centrifuge for the refining of nonferrous metals comprising a base-mounted housing internally subdivided in the transverse direction by annular partitions embracing a bowl disposed wherein is a pusher attached to the piston rod of a hydraulic cylinder located at an end face of the bowl geared to a rotary motor. At the end face opposite the motor, the housing and the contiguous end face of bowl are provided with ports for admitting the metal to be refined inside the bowl and, furthermore, the side wall of bowl is provided with ports for the separate discharging of the refined metal and the particles of impurities through the annular chambers of housing and ports in the side wall of housing. Inside the housing there is in accordance with the invention a contrivance for feeding a coolant to that portion of the outside surface of bowl at the end close to the loading port which is made solid within a height corresponding to the height of the hollow pusher accommodated in the bowl, said portion serving as the side wall confining in cooperation with the solid end face linked up with the end face provided with the loading port by means of radial partitions the space in the hollow pusher during each period of admitting a batch of metal.

By virtue of the cooled bowl constructed on the above lines and accommodating the pusher there is a possibility to provide conditions conducive to the liquation of the batches of the metal refined. Since the bowl is cooled, the metal admitted into the centrifuge has a temperature which is higher than that the known centrifuges can withstand. This provides for considerable reduction of the period elapsed between the pouring out of metal from the furnace and feeding the metal into the centrifuge with the result that more metal is recovered, the waste is reduced and the economy of the refining process is improved.

It is expedient to provide the outside surface of said solid portion of the bowl wall with fins which add to the cooling area. The fins provided on the portion of bowl wall exposed to forced cooling increase the rate of cooling and enable a more effective refining of metals.

The present invention will be best understood from the following description of a preferred embodiment of the centrifuge for the refining of nonferrous metals when this description is being read in conjunction with the accompanying drawing which is a sectional elevation of the centrifuge disclosed.

A hollow centrifuge housing 1 is mounted on a base frame 2. The space inside the housing 1 is subdivided by transversely running annular partitions 3 and 4 into a cooling chamber 5 a refined metal chamber 6 and an impurity chamber 7 which are arranged in succession according to the stages of the process.

Along the longitudinal axis of the housing 1 there is disposed a hollow bowl 8 forming with said annular partitions 3 and 4, which are rigidly attached to the inside of the housing 1, a clearance sufficiently wide to enable the bowl 8 to spin. The hollow bowl 8 accommodates a hollow pusher 9 whose lower end face 10 is a solid one and the upper end face 11 is provided with a loading port 12. The end faces 10 and 11 of the hollow pusher 9 are linked one to another by radial partitions 13. When the pusher 9 is in its topmost position, the space inside said pusher is confined from the sides by a solid portion 14 of the bowl 8 and performs the function of a liquation chamber wherein a batch of molten metal is being poured for subsequent refining. The outside surface of the solid portion 14 of the hollow bowl 8 is provided with fins 15 which add to the cooling area. The cooling chamber 5 is fitted with a contrivance 16 feeding a coolant to the outside surface of the solid portion 14 of the hollow bowl 8.

A portion of the wall of the hollow bowl 8 disposed vertically between the annular partitions 3 and 4 provided with straining holes 17 through which the space inside the bowl 8 communicates with the refined metal chamber 6. Arranged in the wall of the hollow bowl 8 below the annular partition 4 and level with the impurity chamber 7 are ports 18 serving to discharge impurities from the inside of the bowl 8.

For feeding molten metal inside the pusher 9 a port 19 is provided in the end face of the housing 1 and a port 20 in the end face of the hollow bowl 8. In the side wall of the housing 1 there is a port 21 for discharging refined metal and a port 22 for discharging impurities from the centrifuge.

The hollow pusher 9 is attached to the piston rod 23 of a solid piston 24 reciprocating in a hydraulic cylinder 25. Passages 26 provided in the walls of the hydraulic cylinder 25 serve to admit fluid inside said cylinder. The hydraulic cylinder 25 works in bearings 27 mounted on a bracket 28. The lower end face 29 of the hollow bowl 8 is geared to a rotary motor 30.

The hollow pusher 9 is secured inside the hollow bowl 8 with provision for a reciprocating motion imparted by the hydraulic cylinder 25. A bell 31 attached to the side wall of the hollow bowl 8 at the outlet keeps off the splashes of molten metal. Another bell 32 attached somewhat below the bell 31 takes care of the splashing impurities.

The centrifuge for the refining of nonferrous metals operates on the following lines. The rotary motor 30 of the hollow centrifuge bowl 8 is set into operation and hollow pusher 9 acted upon by the solid piston 24 of the hydraulic cylinder 25, is set into the initial topmost position next to the loading port 20 in the end face of the bowl 8. The molten metal to be refined is delivered in a ladle (not shown) from a furnace (not shown) to the centrifuge and poured inside the hollow pusher 9 through the loading port 20 in the end face of the bowl 8 and the port 12 in the top end face 11 of the hollow bowl 8. While the inside of the pusher 9 is being filled with molten metal, a coolant is applied from the contrivance 16 installed in the cooling chamber 5 to the outside surface of the top portion 14 of the spinning bowl 8 which has a solid wall with the fins 15. Acted upon by the centrifugal forces and exposed to the cooling effect, the solid particles of impurities contained in the batch of metal the hollow pusher 9 is filled with separate and liquate towards the axis of rotation of the hollow bowl 8.

After a period required for the batch of metal poured into the centrifuge for refining to cool down and liquate so that its temperature is above the melting point by 150°C, the hollow pusher 9 with its contents, i.e., the cooled down metal, is lowered into the straining zone which is that portion of the wall of the bowl 8 which is pierced with straining holes 17. The centrifugal forces cause the metal refined to pass through the straining holes 17 and enter the bell 31 wherefrom it drips on the annular partition 4 to be removed eventually from the centrifuge through the port 21 into a ladle (not shown).

The cake containing the impurities remains settled on the inside surface of the bowl wall within the zone where the straining of the metal refined takes place until all the liquid metal leaves the hollow pusher 9. After that, the hollow pusher is moved downwards by the hydraulic cylinder 25 until it is level with the ports 18 for discharging the impurities. As the hollow pusher 9 moves downwards, the cake below its end face 11 is pushed downwards and discharged under the action of centrifugal forces through the ports 18 into the bell 32 wherefrom it enters the chamber 7 and leaves the centrifuge through the port 22 in the side wall of the housing 1. A container (not shown) is used to receive the cake discharged from the centrifuge.

At this stage the cycle of refining metal is completed. Preparatory to refining the next batch, the hollow pusher 9 is lifted inside the bowl 9 to its topmost position which is the initial one, using the hydraulic cylinder 25.

The solid piston 24 of the hydraulic cylinder 25 reciprocates integrally with the hollow pusher 9 which is rigidly attached to its piston rod 23 due to the pressure of a fluid, for example oil, fed by a pump (not shown) through the passage 26 in the bracket 28 and walls of the hydraulic cylinder.

The operation of the centrifuge can be controlled automatically by means of any of the known electric circuits which provides for the travel of the solid piston 24 of the hydraulic cylinder 25 in accordance with the procedure of feeding a batch of liquid metal into the hollow pusher 9 of the bowl 8.

The centrifuge embodying the present invention can be used preferably for the separation of lead from copper which is an impurity. When the refining of lead with a high copper content is the process, the centrifuge combines the cooling of mixture and the separation of copper into a single operation and intensifies same. Simultaneously with the separation of metallic admixtures, the centrifuge removes from the lead fresh from a furnace also the remnants of slag which form a solid crystalline phase floating on the surface of the melt spun in the bowl of the centrifuge. The crystalline cake separated from metal in the course of centrifugal refining comprises particles of admixtures and slag. It contains no metallic lead and lends to further processing owing to its structure. The refined liquid lead leaving the centrifuge at a temperature between 400° and 450°C also lends itself to further processing.

The tests of the centrifuge have proved its serviceability as a means of refining lead and lead-tin alloys capable of reducing the copper content of refined lead from 2–3 to 0.3 wt % under the conditions of cooling down to 450°C. Only 15 minutes were required for the refining of a 3-ton batch of lead at a temperature of 1000°C.

What is claimed is:

1. A centrifuge for the refining of nonferrous metals comprising: a base frame; a hollow housing mounted on said base; an end face of said hollow housing wherein a loading port is provided for; a side wall of said hollow housing provided wherein are ports for the separate discharging of the metal refined and the solid impurities; annular transverse partitions attached to the side wall of said housing on the inside and subdividing the space inside the housing into annular chambers; a hollow bowl disposed in said hollow housing; an end face of said hollow housing provided with a loading port; a side wall of said hollow bowl provided with ports for the separate discharging of the metal refined and the impurities through the respective annular chambers and the ports in the side wall of said hollow housing; a hollow pusher disposed in said hollow bowl and provided with a solid end face linked up with the end face wherein a loading port is provided for by means of radial partitions; a solid portion of the wall of said bowl contiguous to the loading port of said wall and extending to a height correspondng to the height of said hollow pusher, said portion serving as the side wall confining the space inside said pusher; a contrivance for feeding a coolant to the outside surface of said solid portion of the wall of the hollow bowl, said contrivance being installed inside said hollow housing; a rotary motor geared to the end face of said hollow bowl; a hydraulic cylinder disposed at the end face of said hollow bowl; a piston of said hydraulic cylinder; a piston rod of said hydraulic cylinder connected to said piston of hydraulic cylinder with one end and to the solid end face of said hollow pusher of the bowl with the other.

2. A centrifuge as claimed in claim 1 wherein said solid portion of the bowl wall is provided with fins on the outside surface, said fins increasing an area of said portion.

* * * * *